June 20, 1944. R. A. KAISER 2,351,859
AIRCRAFT CANOPY
Filed Oct. 25, 1941 3 Sheets-Sheet 1
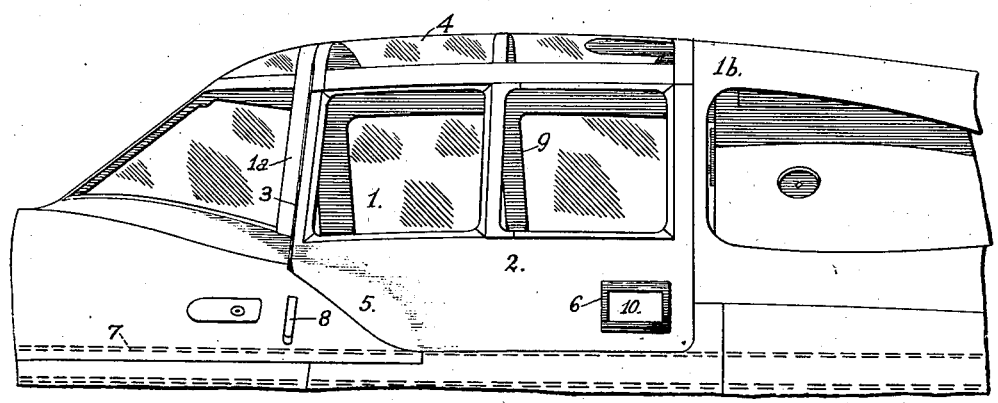
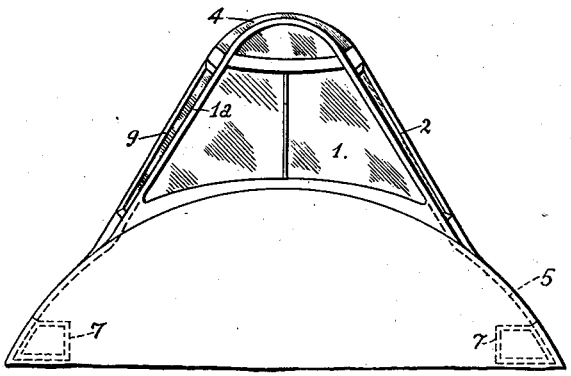
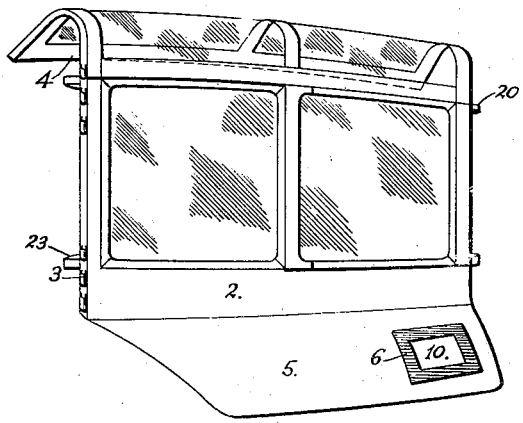
INVENTOR
Robert A. Kaiser
BY
Robert C. Rasche
his ATTORNEY June 20, 1944.    R. A. KAISER    2,351,859
AIRCRAFT CANOPY
Filed Oct. 25, 1941    3 Sheets-Sheet 2
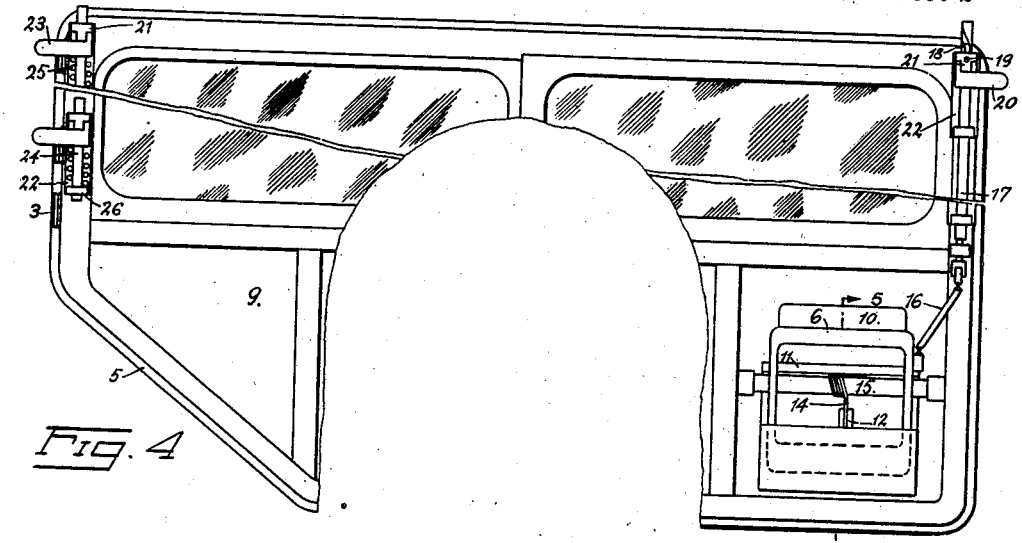
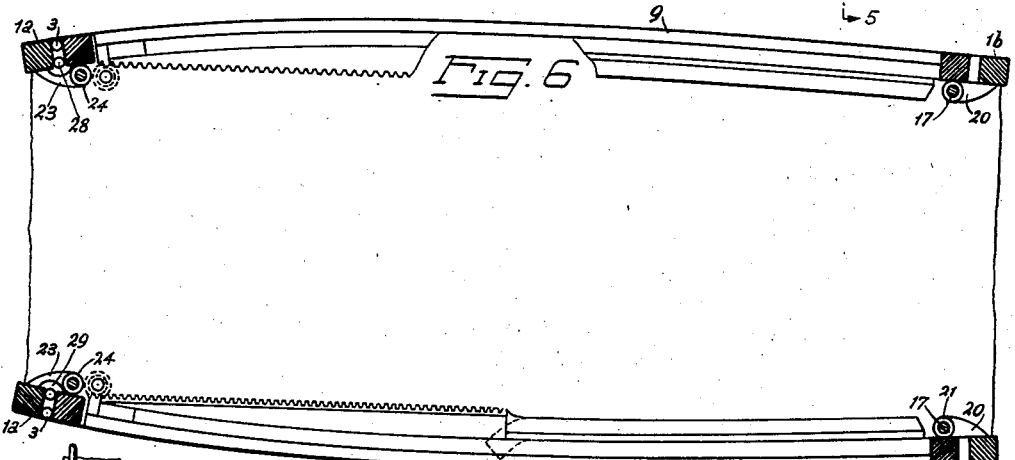
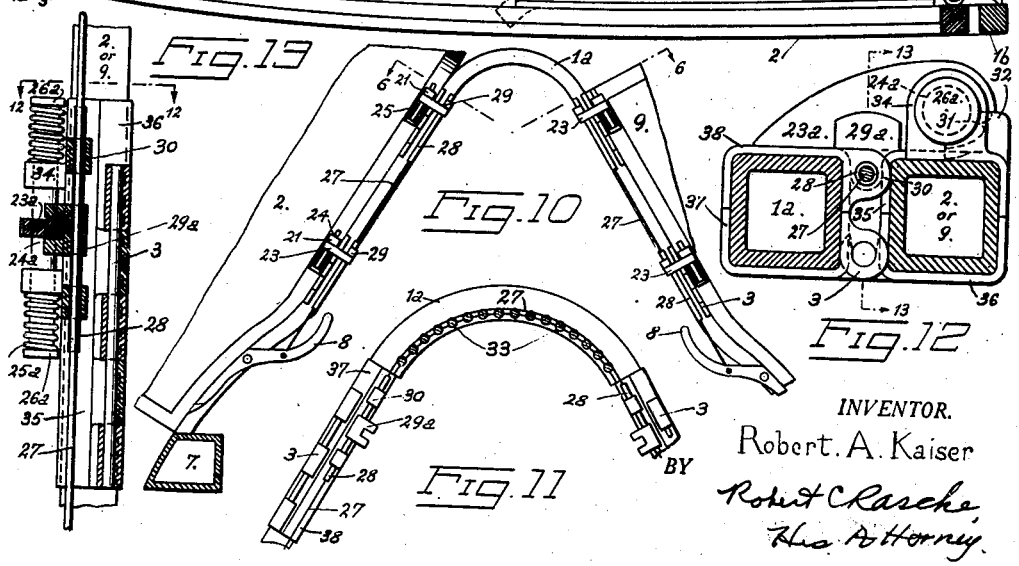
INVENTOR.
Robert. A. Kaiser

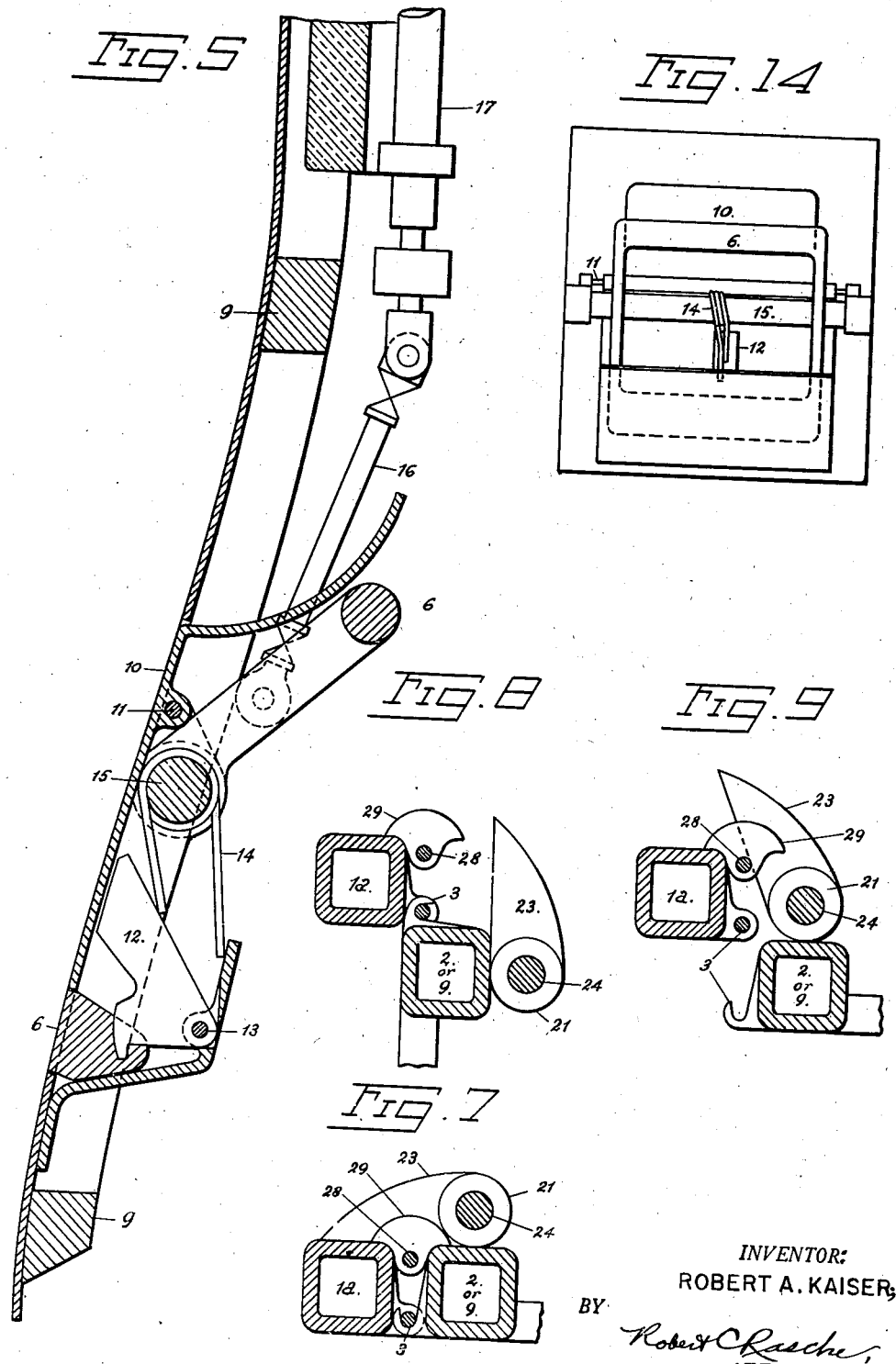

Patented June 20, 1944

2,351,859

UNITED STATES PATENT OFFICE 2,351,859

AIRCRAFT CANOPY

Robert A. Kaiser, Flushing Heights, N. Y., assignor to Republic Aviation Corporation, a corporation of Delaware Application October 25, 1941, Serial No. 416,503

9 Claims. (Cl. 244—121)

The subject of the invention is an improved canopy for aircraft, more specially for single-seater aircraft of the fighter and interceptor types.

The canopy of these aircraft is usually of the sliding type requiring guiding rails which project far back of the pilot's seat and thus necessitate increasing unduly the length and weight of the canopy and render it difficult to obtain a streamlined contour of the canopy.

Other drawbacks of these sliding canopies are that they are likely to be clogged by ice in bad weather, that it is very difficult in practice to make them perfectly airtight, that at high speed and altitudes, due to airstream friction and internal high pressures, they become very hard to discard in case of emergency and that it is practically impossible to prevent them from vibrating, and thereby rattling within their guiding rails.

To avoid all these difficulties and overcome these drawbacks, it has been proposed to use a fixed canopy provided with a lateral hinged door, but due to insufficient entrance space between the ceiling of the canopy and the upper longerons of the fuselage, it becomes then necessary to extend this hinged door downward well within the fuselage and thereby creates a break in structural continuity which weakens the upper structure of the fuselage, unless cumbersome and heavy reinforcing parts are provided around this break.

Contradistinctly, the hinged entrance door and the emergency exit door—if one is used—of the canopy, which is the subject of the present invention, is entirely located above the level of the upper longerons of the fuselage and thus does not weaken the structure of the fuselage.

Another feature of this improved canopy is that its hinged entrance door forms by itself the ceiling of the canopy, thus allowing even a tall pilot to enter the cockpit without having to bend forward.

In the preferred embodiment of the invention, the canopy is provided with a hinged entrance door on the left and with a hinged emergency exit door on the right. Each door is carried by semi-open hinges at its front end and can be held closed by latching means at the rear. These latching means cooperate with the inside face of the turtle-back cover frame and are controlled by a door handle, operable from either outside or inside.

Each door can also be held open by means of a telescopic brace that locks automatically on its active or extended position.

In this preferred embodiment, each hinge comprises fixed pins mounted on the windshield arch and substantially semi-circular hooks, secured to the door frame and having their open sectors so oriented around these pins with respect to the hinge axis that each door is actually hinged only in its open position and as long as it is swinging about the hinge axis but would be free to be either pulled out from the outside or pushed outwards from the inside as soon as it reaches its closed position, were it not for the provision of auxiliary latches on the front end of each door. When in their active position, these latches cooperate with the inside face of the windshield arch so as to complete normally these hinges in the closed position of the door.

These auxiliary latches are slidably and pivotally mounted on vertical guides fixed on the inside of the door frame, clutching means being secured to these guides to prevent, normally, the latches from rotating. Springs are freely mounted on these guides to urge and keep the latches in their clutched or active position. For each door there is an independent emergency release mechanism, entirely mounted on the windshield arch and operable, from either outside or inside by means of an emergency handle, for shifting these latches along their guides against the action of the springs out of the action of the clutching means and thereby free the front end of either door when the pilot wants to bail out of the cockpit, or when, in case of an accidental landing, the rear ends of both doors are jammed and cannot be opened in the usual way from the outside quickly enough to rescue an injured pilot.

In a modification of this preferred embodiment, all the auxiliary latches are controlled by a common control member, interconnecting the two emergency release handles and pullable in either direction. Thus, both doors can be quickly and simultaneously removed by actuating either handle. In that case, the two doors form practically a single quickly detachable unit or section.

When the emergency release mechanisms are thus operated, either separately or conjointly, the telescoping braces are correspondingly freed by the withdrawal of loose pins that normally secure their lower ends to the upper longerons of the fuselage.

In another embodiment of the invention, the entrance door is carried by quick release hinges at its front end. The releasable pins of these hinges are carried on a rod slidably mounted on the windshield arch.

When, in an emergency, the pilot wants to detach quickly the entrance door from its hinges, he pulls this rod down by means of an emergency release handle, mounted on the fuselage so as to be operable from either the inside or the outside.

In this second embodiment, the rear end of the entrance door can be held closed by latching means, similar to the ones of the first embodiment, which cooperate with the inside face of the turtleback cover frame so as to act as a pivot about which the rear end of the door can swing about 90° prior to being sucked away by the airstream, when the front end of the door is released in flight from its hinges in an emergency and is sucked out due to the difference of air pressure acting on the inside and the outside of the door.

The emergency exit door is replaced in this embodiment by a detachable panel, normally held flush with the right wall of the canopy by means of quick release latching means, symmetrically arranged on the front and rear ends of this panel and conjointly operated by means of an emergency control handle mounted in the center of the panel and similar in operation to the entrance door handle in either embodiment. When this emergency release handle is pulled down by the pilot, all these latching means are released simultaneously and the panel is sucked out in the airstream.

Like the entrance door handle, this emergency release handle can also be pulled up from the outside in order to remove quickly the panel and rescue the pilot in case of a forced or out-of-control landing, when the entrance door is jammed.

Further objects of the invention are to give to the canopy smoother and better streamlined contours than it is possible to obtain with a sliding canopy and to improve the visibility by increasing the number and the size of the panes or glass-sashes of the canopy.

Other features and advantages of the present invention will become apparent from the reading of the following description, made in reference to the accompanying drawings, in which:

Figure 1 is a side elevation of an aircraft canopy embodying a preferred form of realization of the invention;

Figure 2 is a corresponding front view;

Figure 3 is a perspective view of the entrance door of this canopy, shown separately;

Figure 4 is an inside elevation of the emergency exit door, shown separately;

Figure 5 is a vertical cross section made on line 5—5 of Figure 4, showing the emergency exit door handle mechanism, which is similar to the entrance door handle mechanism;

Figure 6 is a substantially horizontal section on line 6—6 of Figure 10, showing the canopy with both doors closed;

Figure 7 is a detail of Figure 6 showing at a larger scale the hinge on front side of either door in closed position;

Figures 8 and 9 show the detail of Figure 7 respectively in the open and in the released in an emergency positions of either the entrance or the emergency exit doors;

Figure 10 is a fore-looking elevation of the windshield arch, showing part of the two doors hinged to this arch in their open position;

Figures 11 to 13 show a modification of this preferred form in which both doors can be discarded simultaneously;

Figure 11 being a fore-looking elevation of the windshield arch of this modification, shown separately at a larger scale than Figure 10, Figure 12 being a section similar to Figure 7, made on line 12—12 of Figure 13, Figure 13 being a section made on line 13—13 of Figure 12, and Figure 14 is an enlarged fragmentary view, taken from Figure 4.

The canopy 1 of the aircraft comprises the usual windshield arch 1a and turtle cover frame 1b and in this preferred embodiment, is provided, on the left, with an entrance door 2 hinged at 3 and, on the right, with an emergency exit door 9, likewise hinged as at 3 (Figures 1, 2, 3).

The ceiling 4 of the canopy, comprised between the arch 1a and the frame 1b, forms an integral part of the entrance door 2 and is subdivided into two panes. The lower part 5 of both doors 2 and 9 is bent outwardly so as to follow smoothly the transversal contour of the canopy, while the main body of either door and the inwardly projecting bent top 4 of the entrance door 2 are made longitudinally convex to improve the streamlining of the canopy.

6 indicates the handle of either door, which can be operated from either the outside or the inside. Each of these door handles is normally locked in its closed position, flush with the outer surface of the door, and can be unlocked, also from either the outside or the inside, by means of a central plate 10.

7 shows in dotted lines the location of the upper longerons of the fuselage.

Directly under each door hinge 3 is mounted on the fuselage, flush therewith, an emergency release lever 8, the operation of which will be described in more detail later.

According to the invention, the doors 2, 9 are entirely located above the level of the longerons 7, in order to avoid having to break the structural continuity in the upper structure of the fuselage which would weaken this structure if the doors were to project downward within this fuselage.

As the ceiling 4 is usually too low above the longerons 7 to allow for a sufficient door height, this arrangement of the doors entirely within the limbs of the canopy would be impracticable, were it not for the fact that this ceiling is integral with the entrance door 2, thus providing a three-sided door frame, entirely open upward when the door is open and thereby plenty of entrance door height.

Referring now more especially to Figures 4 to 10, which show the different mechanisms connected with the hinged doors 2 and 9, and first to Figures 4 and 5 showing the parts mounted on the inside of each of these doors, one sees that the locking plate 10 of the door handle 6 is pivoted as at 11 and cooperates with a locking lever 12, pivoted as at 13. A spring 14, mounted on the pivot 15 of the handle 6 tends constantly to hold this lever 12 in its active position, that is, to lock the handle 6.

In order to open either door from inside or outside, one has first to push on the plate 10, in order to be able to pull and swing the handle thus unlocked and exposed. Only then can the door be swung open and held open by means of a telescope brace (not shown) mounted on the longerons 7. Before closing either door, a door brace lock (not shown) must first be released by pressing a trigger on the brace. After closing the door, the handle 6 must be moved until the locking plate 10 snaps back into its flush position, thus allowing the spring 14 to return the locking lever 12 in its active position. This rotation of the handle 6 is transmitted through the intermediary of a link 16 and a vertically slidable connecting rod 17 to a pair of locking prongs or latches 20, secured on this rod. In the top of each rod 17 is cut a compound axial and spiral keyway 18, cooperating with a key 19, traversing a clutch 21, which acts also as a vertical guide for the sliding movement of the rod 17. The height of the axial or vertical part of the keyway 18 and the pitch of the spiral part thereof are such that the two prongs 20 are first swung in active position against the inside face of the turtle cover frame 1b and are then vertically shifted so as to be locked in this angular position by means of the clutches 21 by this movement of the handle 6.

Inversely, when the handle 6 is pulled open, the prongs 20 are first shifted out of engagement with the clutches 21 and are then swung in their position of rest within the swinging sector of the door. Each clutch 21 is mounted on a bracket 22 secured on the inside of the rear end of the door.

Each door hinge 3 comprises fixed pins, mounted on the windshield arch 1a and semi-circular hooks, secured to the front end of the door.

As best shown in Figure 8, these hinges, due to the open sectors of their hooks, act by themselves as real hinges to carry and pivot the doors 2, 9 only in the open position of these latter or during their swinging movement about the hinge axis. When the doors are closed, a releasable auxiliary prong 23 behind the windshield arch 1a held in its active position shown in Figure 7, is required to complete each hinge 3 in order to prevent the falling of the doors out of their hinges. Each auxiliary prong 23 is slidably and pivotally mounted on a fixed rod 24 between a clutch 21 and a bracket 26, a spring 25 being interposed between the prong and the bracket 26 so as to hold the prong normally engaged within the clutch and thereby prevent its rotation.

To release these auxiliary prongs, when the pilot wants to bail out of the cockpit, or when, in an accidental landing, the rear ends of both doors are jammed and cannot be opened with the handles 6 from the outside quickly enough to rescue a wounded pilot, there is provided an independent emergency release mechanism for each door 2 and 9. These two release mechanisms are entirely mounted on the windshield arch 1a and are normally operated from either the outside or the inside by means of the emergency levers 8.

Each lever 8 controls, through the intermediary of a cable 27, two sliding rods 28 carrying each a pusher 29. These latter push down the auxiliary prongs 23 out of engagement with the clutches 21 when the lever 8 is manually operated. The two prongs 23 are then free to rotate about the rod 24 and the front end of the door can be detached from the frame 1a (as shown in Figure 9).

Figures 11, 12 and 13 show a modification of this embodiment, in which all the auxiliary prongs 23a of both doors 2 and 9 can be simultaneously shifted in either direction against the action of springs 25a by means of forks 29a carried on sliding tubes 28 slidable in guides 30. All these tubes 28 are carried on a common control cable 27, passing over rollers 33 (Figure 11) around the top of the arch 1a and interconnecting the two emergency release levers 8. Thus, when either of the levers 8 is manually operated from either the inside or the outside, both doors 2 and 9 are quickly and simultaneously detached from the windshield arch 1a.

In this modification, each auxiliary prong 23a is fixed on a short rod or pin 24a, slidably mounted in guides 34 and carrying on each end an abutment 26a for the springs 25a. The hub of each prong 23a is provided with a notch 31 (Figure 12) into which fit a stop 32 in the active position of the prong.

The guides 34 and the stop 32 are carried on a U-shaped bracket 35 embracing the inside half of the front end of the frame of either door 2 or 9, while a similar bracket 36, embracing the outside half of this frame, carries the hooks or semi-open rings of the hinges 3.

Similarly, the fixed pins of these hinges are carried on a U-shaped bracket 37, embracing the outside half of the windshield arch 1a, while a complementary bracket 38, embracing the inside half of this arch, carries the guides 30.

In another embodiment of the invention (not shown) the emergency release mechanism of the entrance door 2, instead of releasing auxiliary prongs 23 or 23a, pulls slidable hinge pins out of hinge rings carried alternately by the arch 1a and the frame 2.

The emergency exit door is replaced in this embodiment by a detachable panel, normally held flush with the right wall of the canopy by means of four quick release latches or prongs, similar to the prongs 23, which are symmetrically arranged on the front and rear ends of this panel and which are conjointly operated by means of a common emergency release lever, mounted in the center of the panel and similar in operation to the entrance door handle 6.

When all these four prongs are released simultaneously in flight, the emergency exit panel is sucked out in the airstream.

Having now made certain the nature and purposes of my invention, and at least one mode of executing same, in such manner as to enable anyone skilled in the art to which it appertains, to make and use same, as required by the statutes, that which I claim as my property, and desire to secure by Letters Patent of the United States, is:

1. In an aircraft canopy having a fixed body, comprising a windshield, a turtle-back cover and at least one lateral door hinged to the arch of said windshield and fastenable to the arch of said turtle-back cover: a plurality of quickly-openable hinges detachably connecting said door to the arch of said windshield, and a manually-operated emergency release mechanism mounted on said fixed body for simultaneously and instantaneously opening said hinges in an emergency in such manner as to free the hinged edge of the door from the windshield arch and release the whole door to the action of the airstream without having to unfasten its opposite edge from the turtle-back cover arch.

2. In an aircraft canopy having a fixed body mounted upon the fuselage above the level of the upper longerons thereof and comprising a windshield, a turtle-back cover and two opposite lateral doors hinged to the arch of said windshield and adapted to be fastened to the arch of said turtle-back cover: a plurality of quickly-openable hinges detachably connecting the front edge of each of said doors to the arch of said windshield, a plurality of latches projectable beyond the rear edge of each of said doors and cooperating with the inside face of the arch of said turtle-back cover to fasten the doors in their closed position, a door handle, actuatable from either the inside or the outside of the canopy and mounted on each door to bring simultaneously all the latches of said door into or out of their active positions, and a manually-operated emergency release mechanism, also actuatable from either the inside or the outside of the canopy, but mounted on said fixed body, for simultaneously and instantaneously opening all the hinges of either door in an emergency, thereby detaching the front edge of said door from the windshield arch and releasing the whole door to the action of the airstream without having to open the door by means of said door handle.

3. In an aircraft canopy including a door associated with a windshield, a door hinge of the open type, comprising a fixed pin, mounted on the arch of the windshield, a semi-circular hook, fastened to the front edge of the door and a complementary prong, slidably and rotatably mounted on said front edge and normally cooperating with the inner face of the windshield arch to close the hinge in closed position of the door, and a manually-operated emergency release mechanism comprising a double-action emergency handle and tensile means mounted along said windshield arch so as to shift simultaneously said prongs out of their active position when, in an emergency, said handle is either lowered from the inside of the canopy or is raised from the outside.

4. In an aircraft canopy having a fixed windshield and at least one lateral door hinged to the arch of said windshield by means of hinges of the open type comprising a fixed pin, a semi-circular hook and a complementary prong: a guiding rod fixed on the inside of said door along the front edge thereof, complementary prongs slidably and rotatably mounted on said rod to cooperate with the inside face of the windshield arch, clutches and springs arranged on said rod so as to hold normally said prongs in active position by preventing their rotation, and manually-operated emergency release means, mounted on the fixed windshield and actuatable in an emergency from either the inside or the outside of the canopy for shifting said prongs simultaneously and instantaneously along said rod and against the action of said springs out of the grip of said clutches.

5. In an aircraft canopy having a fixed windshield and two opposite lateral doors hinged to the arch of said windshield by means of hinges of the open type comprising each a fixed pin, a semi-circular hook and a complementary prong to close the hinge in closed position of the door: fixed hinge pins carried on both sides of the windshield arch, semi-circular hinge hooks carried on the front edge of each of said doors, complementary notched prongs slidably and rotatably mounted on said front edges, springs acting in opposite directions on said prongs to hold them normally in a central position, stops carried on said front edges and cooperating with the notches of said prongs to prevent their rotation when in said central position and thereby hold them in active position, a pair of double-action emergency handles, mounted on said fixed windshield, one under the front edge of each door, a tensile connection between said handles guided around the windshield arch, and push-pull forks fastened to said tensile connection so as to shift out of their central active position simultaneously all the prongs of both doors when, in an emergency, either of said handles is operated.

6. In an aircraft canopy including a door hinged to the windshield: a door hinge of the removable pin type, comprising shiftable pins guided along the windshield arch and hinge rings or sleeves alternatively carried on said arch and on the front edge of the door, and a manually operated emergency release mechanism comprising a double-action emergency handle and tensile means mounted along said windshield arch so as to shift simultaneously said pins out of their active position within said hinge rings when, in an emergency, said handle is operated.

7. In an aircraft canopy having a fixed body mounted upon the fuselage above the level of the upper longerons thereof, said body including a transparent windshield and a turtle-back cover: a left-hand side lateral entrance door having an upper wing projecting beyond the plane of symmetry of the aircraft, detachably hinged to the arch of said windshield and fastenable to the arch of said turtle-back, and an emergency detachable panel normally held flush with the right-hand side of the canopy within the frame formed by one of said upper longerons, said windshield arch, the upper edge of said door and said turtle-back cover arch; two pairs of latches normally fastening said panel to said windshield arch and said turtle-back cover arch respectively, a double-action emergency handle carried in the center of said panel and mechanical connections between said handle and each of said latches for instantaneously and simultaneously withdrawing said latches from behind said fixed arches and thereby releasing said panel to the action of the airstream when, in an emergency, said handle is operated.

8. In an aircraft canopy having a fixed windshield and a fixed turtle-back cover mounted on the fuselage above the level of the upper longerons thereof: at least one swingable and detachable lateral door hinged to the arch of said windshield and fastenable to the arch of said turtle-back cover, and a manually-operated emergency release mechanism, actuatable from either the inside or the outside of the canopy to release in an emergency either the front edge of said door from said windshield arch or the rear edge thereof from said turtle-back cover arch, the other edge being adapted to act then as a hinge.

9. An aircraft canopy comprising a fixed body having an opening, a door normally to close said opening, releasable hinges connecting the forward edge of said door to said body for swinging movement with respect thereto into open or closed position, means carried by said body and operable by the pilot to release said hinges, and means connecting said hinges to said first-named means.

ROBERT A. KAISER.